Sept. 22, 1959  F. N. PHILLIPS, JR  2,904,838
METHOD OF MANUFACTURE
Filed March 14, 1956  2 Sheets-Sheet 1
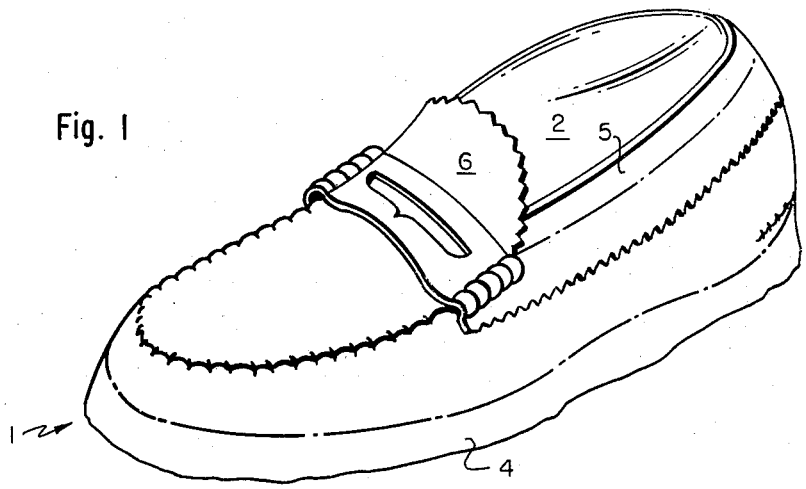
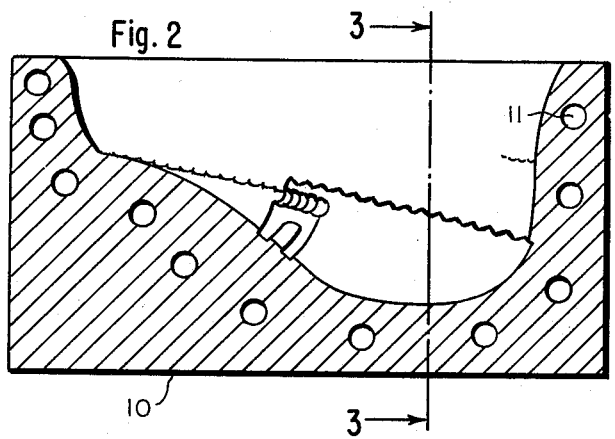
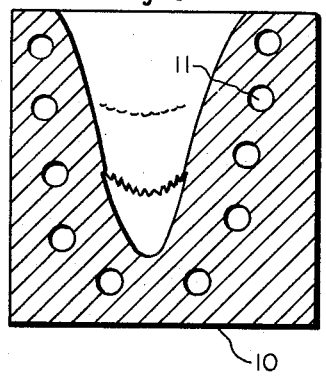
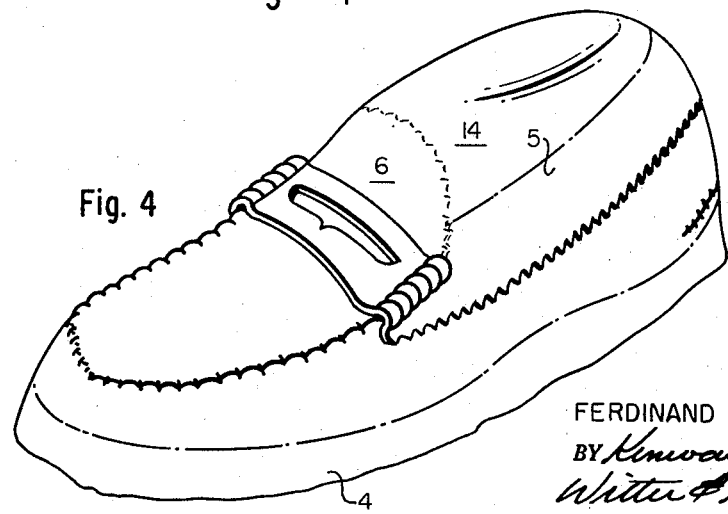
INVENTOR.
FERDINAND N. PHILLIPS, JR
ATTORNEYS Sept. 22, 1959     F. N. PHILLIPS, JR     2,904,838
METHOD OF MANUFACTURE Filed March 14, 1956     2 Sheets-Sheet 2

*INVENTOR.*
FERDINAND N. PHILLIPS, JR.
BY *Kenway Jenney Witter & Hildreth*
ATTORNEYS United States Patent Office 2,904,838
Patented Sept. 22, 1959

2,904,838
METHOD OF MANUFACTURE
Ferdinand N. Phillips, Jr., Brookline, Mass.
Application March 14, 1956, Serial No. 571,554
5 Claims. (Cl. 18—47.5)

Numerous attempts have heretofore been made to manufacture a preformed upper from thermoplastic material, but the results have been generally unsatisfactory in that they have not produced an appearance acceptable to the trade. For example, attempts to mold a flat shoe upper or shoe upper section having a selected grain and such embellishments as stitching, pinked trimming, etc., result in producing distortions when the upper section is lasted and hence detracts from the appearance of the finished shoe. A further difficulty is due to the resistance of thermoplastic materials to bending and folding, and the tendency to return to their original shape or position, a characteristic popularly termed "plastic memory." For example, the resistance of thermoplastic sheet material to toe-lasting, due to the inability to shrink such material to conform to the last as is done with leather by the application of a steam heated wiper, etc., constitutes serious drawback. On the other hand, there is no feasible method of molding a complete shoe upper in the precise form it presents when properly lasted preparatory to the sole laying operation.

The principal object of the present invention is to provide a preformed shoe upper and a feasible method of making the same, which shoe upper when applied to the last presents an appearance substantially identical to that of a high grade shoe upper made from leather or such other suitable material as patent leather, alligator or reptile prints, upper leather of fabric effects, or whatever materials or effects are currently popular for shoe uppers.

Other objects are to provide a preformed shoe upper having an inwardly turned lasting allowance and/or edges which may be readily cemented or otherwise secured in place, and to provide a preformed upper having a liner of suitable fabric securely attached to its inner face so that the upper may be directly applied to a last and insole structure.

Further objects will be apparent from a consideration of the following disclosure and the accompanying drawings, wherein:

Fig. 1 is a perspective view of a prelasted shoe upper mounted on a last-like support with its lasting allowance and upper edges of its quarters turned outwardly preparatory to forming a cavity mold therefrom;

Fig. 2 is a longitudinal section through a cavity mold formed from the shoe upper of Fig. 1;

Fig. 3 is a section on the line 3—3 of Fig. 2;

Fig. 4 is a perspective of an untrimmed upper produced by the mold shown in Figs. 2 and 3;

Figure 5:
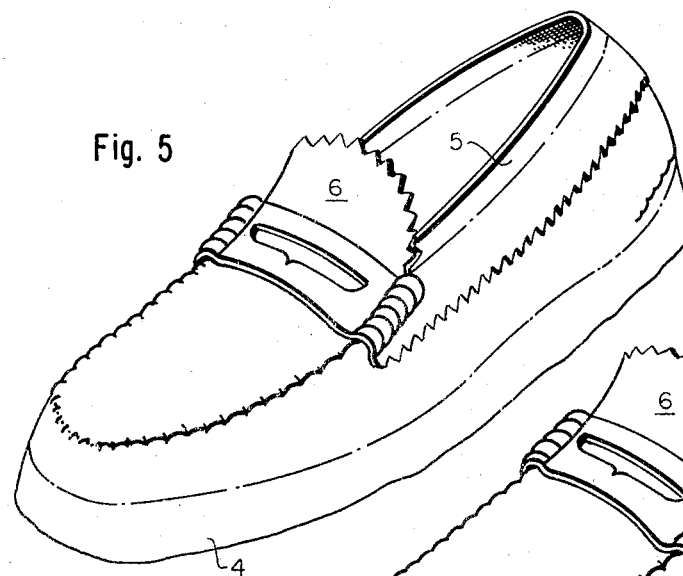
Fig. 5 is a perspective of the trimmed upper.

In accordance with the present invention a master pattern is first provided and to this end a shoe upper assembly made from leather or other suitable material is applied to a last and its lasting allowance, which is preferably somewhat greater than usual, is temporarily secured so as to permit the entire upper to conform to the last in accordance with high standard lasting procedures. The lasted upper may then be permitted to stand for a period sufficient to insure a "set" of the stretched parts, after which the lasting allowance is detached from the last and straightened out to form a slightly divergent depending skirt or flange, the operation being carried out so as to avoid injury to or marring of the surface of the upper. Alternatively, the upper of a completed shoe may be carefully separated from the insole and outsole structures and then applied about a last or other suitable support with its lasting allowance extending outwardly as above described, thereby providing the master pattern.

If the shoe upper be of the type that has inturned margins at the upper edges of the quarters, the stitching may be removed so that these inturned edges may be folded outwardly against the upper surface of the last to prevent excessive deformation at these areas and thus insure a better ultimate appearance. In some cases it may be advisable, if not necessary, to remove the stitches at the junction seam of the quarters so as to open up the rear of the shoe upper or a part thereof, depending upon the particular type of shoe. Where the style of the shoe embodies quarters which are stitched to the rear of the vamp, the master pattern may be formed in two sections, i.e., the forepart comprising the vamp, tongue, etc., and the rear part comprising the quarters. In any event the shoe upper thus prepared provides the master pattern which has necessarily undergone a certain amount of distortion in its contour as a result of lasting and this pattern, while mounted on the last or other suitable support, is then used in preparing a three-dimensional female die or cavity mold.

Such a mold may be prepared in accordance with recognized practices, care being taken to provide a mold which faithfully reproduces the outer surface of the upper, including such deformations as have developed as a result of the releasing and folding outwardly the lasting allowance, upper edge of the quarters, etc. Although match die molding procedures may be employed, vacuum bag, pressure bag and flexible plunger molding are considered more suitable for thermoplastic sheet materials, and since these procedures are described in the 1955 edition of Modern Plastics Encyclopedia, reference thereto may be had for a more detailed disclosure.

As used herein and in the claims, the term "distortion" or "distortions" is meant to refer to shrinkage, stretching, etc., in the leather or other materials used in forming the master pattern, as for example when the leather is lasted to form a toe portion. When the lasted master pattern is unfolded, the distortions remain but additional "deformations" are produced. These deformations appear in the molded preformed upper but disappear when the preformed upper is lasted. The distortions however remain in the preformed upper just as they appeared in the master pattern and accordingly produce a preformed upper identical with the master pattern.

The particular type of thermoplastic sheet material may vary, but the vinyl resins as a class are satisfactory, particularly the acetate-chloride copolymer. Preferably the selected sheet is laminated with a deformable fabric, such as a non-woven fibrous sheet, Jersey cloth, or the like, which not only provides the liner for the upper, but also a reinforcement. The thickness of the laminated structure, or that of the thermoplastic sheet may vary from a practical minimum of about 0.02 inch to a maximum which need not exceed 0.05 inch, a thickness of the order of 0.035 inch being generally satisfactory. However, the gauge or thickness will depend upon the wearer, whether a man, woman or child, and the particular type or style of shoe, whether a sport, dress, moccasin, etc.

The resulting product, when removed from the die or mold is in most cases an untrimmed and/or unfinished upper which must have the material between the upper margins of the quarters trimmed and the lower margins of the quarters turned in and sewed; and likewise where the quarters have been wholly or partly separated, these parts must now be either stitched together, or patched so as to present the original appearance of the shoe. In any case, the pre-lasting finishing procedure will depend on the particular type of shoe upper that is to be produced. In the case of oxfords and the like type shoes the lacing holes may be punched and eyeleted and the tongue may be applied before or after lasting.

After having trimmed and stitched the molded upper it is then ready for lasting in accordance with conventional practices. The unlasted upper, as above noted, has the same deformations and distortions as the master pattern, but the lasting operation is effective to iron out or otherwise remove the deformations so that the lasted upper corresponds with the master pattern before being removed from the last. In other words, such deformations as are produced by or incident to the removal of the master pattern from the last are carried over into the mold and transferred to the molded uppers, but are later removed by the proper lasting of the molded upper.

The resulting shoe structure is in all particulars identical to that of the original shoe or the shoe that would have been produced from the master pattern and it is to be understood that any process applicable to the lasting and finishing of the master pattern is generally applicable to the molded shoe upper prepared therefrom. Since the thermoplastic sheet has been subjected to heat and pressure its tendency to return to its original flat form has been overcome, that is, its "plastic memory" has been destroyed.

Referring to the drawings, the particular embodiment shown for the purpose of illustration provides an upper for that type of shoe popularly known as a "loafer." The master pattern 1 after removal from a last is mounted on a last-like support 2 with its lasting allowance 4, hemmed quarters 5 and tongue 6 disposed against the adjacent marginal portions of the support. Although the pattern 1 fits the support 2 as snugly as possible, certain deformations in the contour of the upper invariably are produced.

A cavity mold 10 having heating ducts 11 is produced from the pattern 1 mounted on the support 2, care being taken to reproduce in intaglio the aforementioned deformations and also to extend those portions of the mold corresponding to the lasting allowance so that the width is increased by about ⅛ to ¼ inch. Since the techniques involved in producing such molds are now well known in the art, reference to standard works may be had for a more complete disclosure.

Having produced a cavity mold conforming to the pattern 1, a shoe upper is reproduced from a flat sheet of suitable thermoplastic material of the desired color, such as a vinyl acetate-chloride copolymer having a thickness of about 0.035 inch and lined with Jersey cloth or the like which is adhesively secured or otherwise suitably attached to one face. To this end the sheet of lined thermoplastic material if first cut to a size to fit the mold cavity 12 with minimum waste, and the blank sheet is then inserted so that its unlined surface is against the cavity walls. A pressure bag or flexible plunger is then forced into the cavity and the heat is turned on. The pressure on the bag or plunger is then increased to a point sufficient to cause the thermoplastic material to conform to the contour of the mold and the heat and pressure is maintained for about a minute to insure plastic flow and consequent loss of "plastic memory," after which the cooling fluid may be turned on and the upper carefully stripped from the mold.

The upper thus produced conforms to the master pattern 1, except that the parts corresponding to the tongue 6 and turned out hem quarters 5 are integrally connected by a panel 14 (Fig. 4). Since the grain or characteristic appearance of the hem quarter 4 and tongue 5 have been preserved there is a clear line of demarcation, indicated by the dot and dash lines of Fig. 4, which provides a guide for cutting the parts from the panel 14, and the same is true with respect to the junction line defining the lasting allowance 4.

Figure 6:
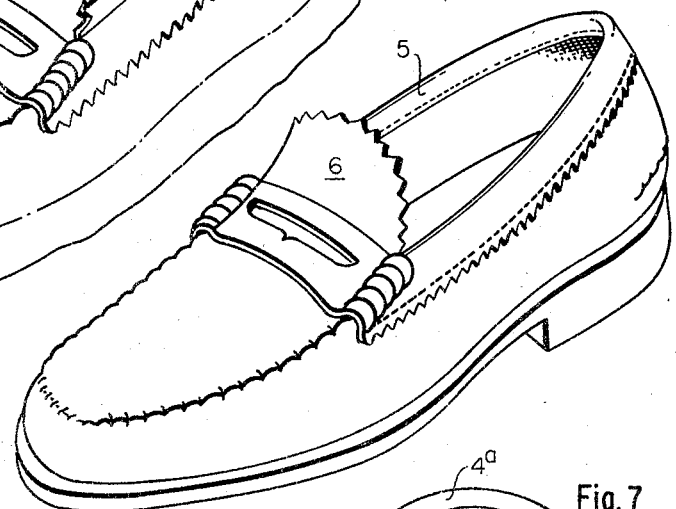
Fig. 6 is a perspective of a shoe produced from the upper shown in Fig. 5.

After having removed the panel 14, as shown in Fig. 5, the hemmed quarters 5 are turned in and stitched and the upper is then applied to a last carrying an insole structure. From this point on any of the conventional lasting procedures may be employed, followed by sole-laying, heel applying and the usual finishing operations. The shoe thus produced, as shown in Fig. 6, is a substantial replica of the original from which the master pattern was produced, or the shoe that would have been produced from the master pattern, since the deformations produced in the master pattern as a result of unfolding and transferred to the molded upper have been removed by the lasting operation. Moreover, the toughness and flexibility of the thermoplastic sheet are preserved, and the liner 16 being thoroughly bonded to the thermoplastic sheet, not only presents an attractive appearance, but furthermore serves as a reinforcement.

Figure 8:
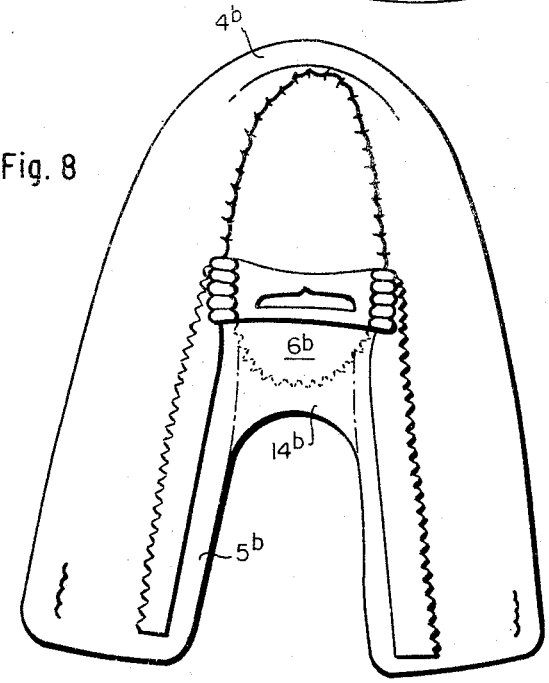
Fig. 8 is a view similar to Fig. 7 but showing a further modification wherein the rear of the upper is separated.
Figure 7:
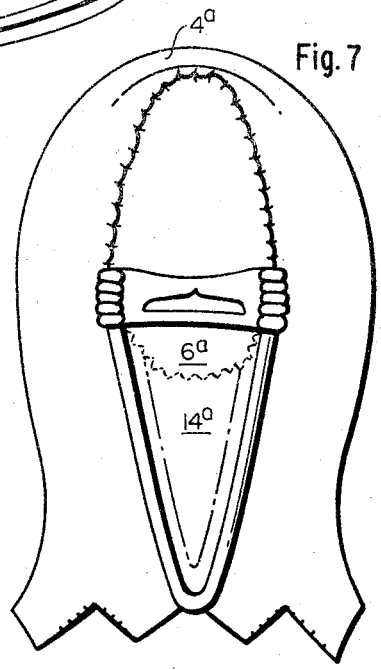
Fig. 7 is a top plan view showing a modified form of upper with its heel section partly cut away.

It is sometimes desirable to employ a more shallow mold than that shown in Figs. 2 and 3 and in such cases the master pattern and mold, and consequently the molded upper, may be varied as indicated in Figs. 7 and 8, wherein similar reference characters are applied to correspondnig parts. The untrimmed molded upper shown in Fig. 7 is produced from a master pattern having the rear quarter sections below the hem 5a cut to provide zig zag edges. Prior to the lasting operation these edges are brought together and overlayed with a back stay or the like which may be stitched, cemented or otherwise secured to the quarters. The molded upper shown in Fig. 8 is similar to that shown in Fig. 7, except that the rear has been completely severed and here again, prior to the lasting operation, the severed edges are brought together and secured by a backstay which may extend over the junction of the hemmed quarters. In all other material particulars the procedure and resulting product are the same as those above described.

While I have shown and described different desirable embodiments of the invention it is to be understood that this disclosure is for the purpose of illustration and that various changes and modifications may be made without departing from the spirit and scope of the invention as set forth in the appended claims.

I claim:

1. The method of making a preformed shoe upper which comprises the steps of preparing a master pattern, said pattern being prepared by lasting a shoe upper having the characteristic appearance desired in the preformed shoe upper, unfolding said lasted shoe upper and substantially spreading it while retaining the distortions therein resulting from lasting, preparing from said master pattern a cavity mold having a concave surface with a contour complementary to that of the outer surface of said pattern, pressing a thermoplastic sheet against said concave surface with sufficient heat and pressure to cause its contacting face to assume the contour of said concave surface, removing the molded thermoplastic sheet to produce the preformed upper with said distortions therein, and placing the preformed upper on a last, whereby a replica of the original lasted shoe upper is produced.

2. The method defined in claim 1, wherein a layer of deformable fabric is secured to the inner face of said thermoplastic sheet to provide a liner for the upper.

3. The method of making a preformed shoe upper having quarters with inturned upper edges which comprises the steps of preparing a master pattern, said pattern being prepared by lasting a shoe upper having quarters with inturned upper edges and having the characteristic appearance desired in the preformed shoe upper, unfolding said lasted shoe upper, including the inturned edges on said quarters and substantially spreading it while retaining the distortions therein resulting from lasting, preparing from said pattern a cavity mold having a concave surface with a contour complementary to that of the outer surface of said pattern, pressing a thermoplastic sheet against said concave surface with sufficient heat and pressure to cause the contacting surface to assume the contour of said concave surface, removing the molded thermoplastic sheet to produce the preformed upper with said distortions, and placing the preformed upper on a last, whereby a replica of the lasted shoe upper used as a master pattern is produced.

4. The method of making a preformed shoe upper having a lasting allowance about its vamps and quarters which comprises preparing a master pattern, said pattern being prepared by lasting a shoe upper having the characteristic appearance desired in the preformed shoe upper, unfolding said lasted shoe upper, including the lasting allowance integrally attached thereto, separating the quarters of said upper at their lower edge to provide a pattern having a partially open rear, and substantially spreading said upper while retaining the distortions therein resulting from lasting, preparing from said master pattern a cavity mold having a concave surface with a contour complementary to that of the outer surface of said pattern, pressing a thermoplastic sheet against said concave surface with sufficient heat and pressure to cause its contacting face to assume the contour of said concave surface, removing the molded thermoplastic sheet to produce the preformed shoe upper with said distortions, and placing the preformed upper on a last, whereby a replica of the lasted shoe upper used as a master pattern is produced.

5. The method defined in claim 4, wherein one surface of the thermoplastic sheet is bonded to a deformable fabric to provide a liner for the upper.

References Cited in the file of this patent

UNITED STATES PATENTS

| | | |
|---|---|---|
| 2,450,490 | Shinberg et al. | Oct. 5, 1948 |
| 2,568,292 | Murray | Sept. 18, 1951 |
| 2,582,298 | Ushakoff | Jan. 15, 1952 |
| 2,607,664 | Nissel | Aug. 19, 1952 |